T. H. MILLER.
CENTRIFUGAL MACHINE FOR SEPARATING SOLIDS FROM LIQUIDS.
APPLICATION FILED MAR. 7, 1904. RENEWED JULY 17, 1912.
1,057,443.
Patented Apr. 1, 1913.
3 SHEETS—SHEET 1.
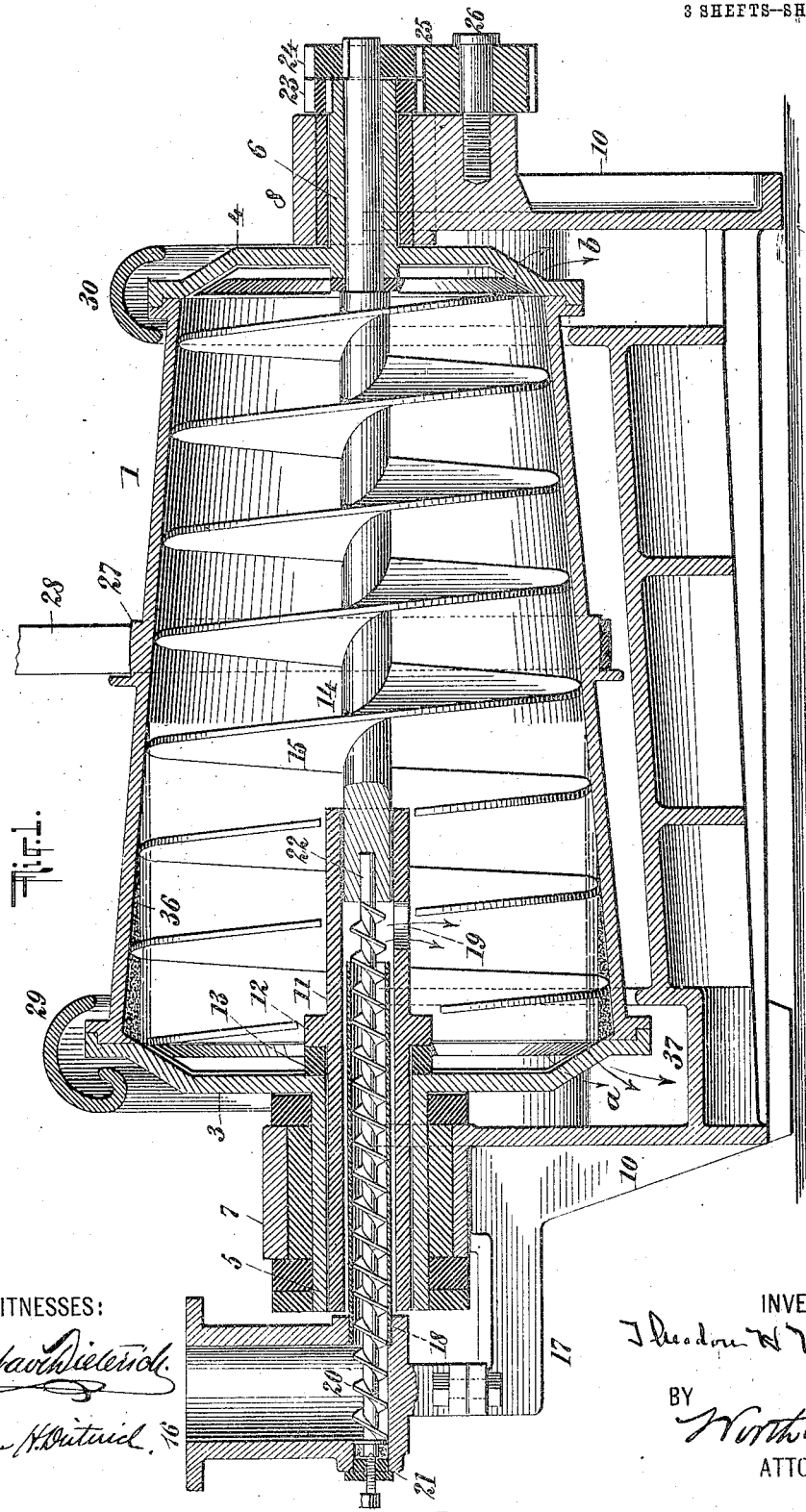
WITNESSES:
INVENTOR
BY
ATTORNEY T. H. MILLER.
CENTRIFUGAL MACHINE FOR SEPARATING SOLIDS FROM LIQUIDS.
APPLICATION FILED MAR. 7, 1904. RENEWED JULY 17, 1912.
1,057,443.
Patented Apr. 1, 1913.
3 SHEETS—SHEET 2.
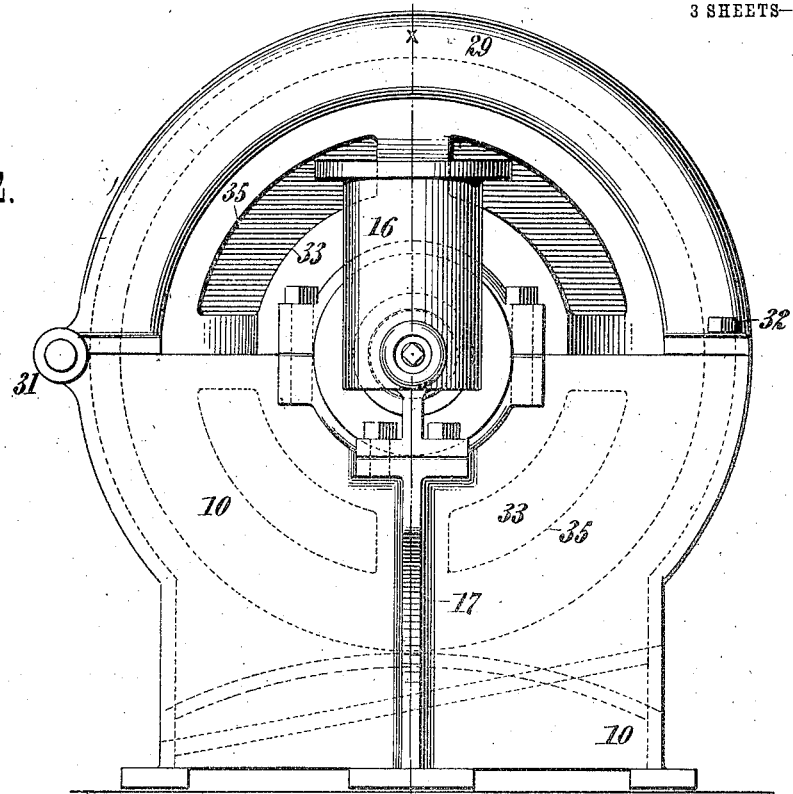
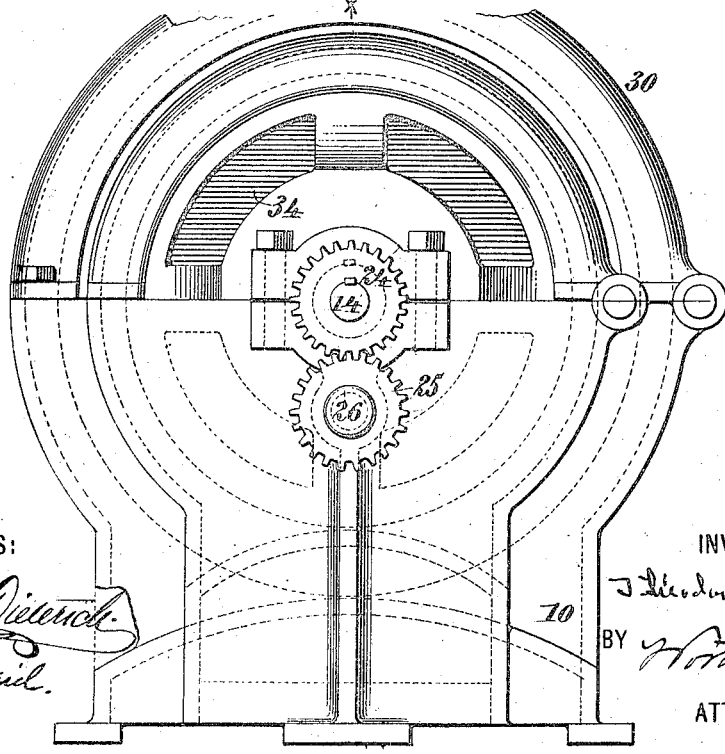
WITNESSES:
INVENTOR
ATTORNEY

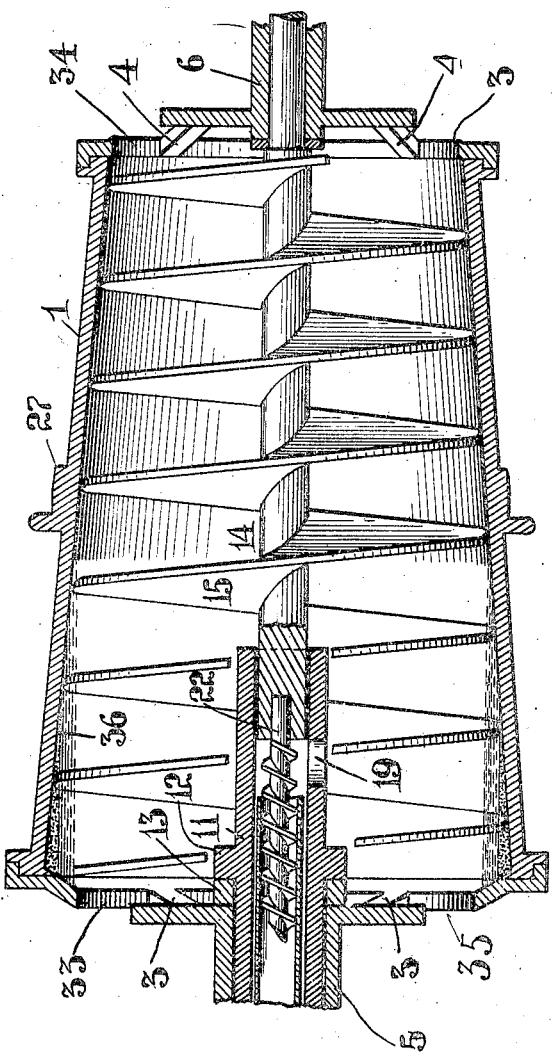

UNITED STATES PATENT OFFICE.

THEODORE H. MILLER, OF POUGHKEEPSIE, NEW YORK, ASSIGNOR TO FRANCIS J. AREND, OF NEW YORK, N. Y., AND JOHN BERNSTROM, OF STOCKHOLM, SWEDEN.

CENTRIFUGAL MACHINE FOR SEPARATING SOLIDS FROM LIQUIDS.

1,057,443.  Specification of Letters Patent.  Patented Apr. 1, 1913.

Application filed March 7, 1904, Serial No. 196,960. Renewed July 17, 1912. Serial No. 710,058.

*To all whom it may concern:*

Be it known that I, THEODORE H. MILLER, a citizen of the United States, and resident of Poughkeepsie, Dutchess county, New York, have invented a new and useful Improvement in Centrifugal Machines for Separating Solids from Liquids.

My invention relates to the separation of solid from liquid materials by the agency of centrifugal force, and consists in a machine constructed and operating upon a new principle for that purpose. The combined materials to be separated are introduced into a rotary vessel, and thereafter are centrifugally projected and caused to form a ring within and around its circumferential wall. In this ring the component of greater specific gravity lies nearest the wall and the liquid is on the inner periphery of said ring. In order to separate and remove the liquid I arrange an outlet in said vessel between the circumferential wall and the axis of rotation; so that, as soon as the liquid reaches this outlet, it will escape therefrom. I also arrange in the rotary vessel a conveyer which operates to move the solid material forming the ring from its place of deposition near the inlet to the outlet at the opposite end of the vessel where it is ejected.

It will be seen, therefore, that my new principle consists in drawing off the liquid ingredient from the inner periphery of the centrifugal ring through a suitably placed opening, and removing the remaining solids by a conveyer from their place of deposit and carrying them to an outlet at the end of the vessel opposite to that at which they enter.

My invention further consists in the construction as more particularly pointed out in the claims.

In the accompanying drawings Figure 1 is a longitudinal section on the line *x x* of Fig. 2. Fig. 2 is an elevation of the left hand end of the machine, as shown in Fig. 1, and Fig. 3 is an elevation of the right hand end. Fig. 4 shows a longitudinal section of the separating vessel and associated parts, taken through the discharge openings in the ends of said vessel.

1 is a conical separating vessel. Its circumferential wall is non-foraminous. At the large end it is provided with a spider 3 and at the small end with a spider 4. The spider 3 has at its central portion the hollow trunnion 5, and the spider 4 also at its central portion has the hollow trunnion 6. The trunnions 5 and 6 are supported in fixed bearings 7 and 8 in the casing 10. Extending through the trunnion 5 and into the separating vessel 1 is a sleeve 11. Said sleeve is flanged, as shown at 12, and this flange bears against a packing ring 13 interposed between it and the central portion of the spider 3. The sleeve is fast on the end of the shaft 14, which extends through the hollow trunnion 6. Said shaft carries conveyer blade 15, which blade projects beyond the point where the shaft 14 enters the sleeve 11, and has a central opening to receive said sleeve. 16 is the feed receptacle which is supported on brackets 17 of casing 10. It communicates with a sleeve 18, which is fixed in its lower portion. Said sleeve enters sleeve 11 and extends nearly to the escape opening 19 in said sleeve 11. Within the sleeve 18 is a screw conveyer 20, one end of the shaft of which is journaled in the side of the feed receptacle 16, as shown at 21. The other end 22 is fast in the end of shaft 14. On the other end of the hollow trunnion 6 is a gear 23, and on the end of conveyer shaft 14 is a gear 24. Both of these gears mesh with a wide pinion 25 which turns on the stud 26, which extends outwardly from the casing 10. The teeth of gears 23 and 24 are not alike in number. A portion of the wall of the separating vessel is made crowning, as shown at 27, for the reception of a driving belt 28. The upper semi-circular trough-like portion of the casing, as shown at 29, 30, is hinged to the lower portion 10, as shown at 31, and may be secured by bolts, as represented at 32.

By reason of the construction of the spider 3 at the large end of the vessel, openings 33 are formed for the escape of the liquid, while through the spider 4 at the other end similar openings 34 serve for the escape of the solid. The construction of the spider 3 is to be such that the outermost edge of the openings 33—said edge being indicated at 35, Fig. 2—is at such a distance from the inner periphery of the circumferential wall of the vessel as that the liquid which will form the inner boundary of the ring of combined materials formed by centrifugal action around the inner periphery of the vessel will then escape by decantation over said edge 35 and in this way become separated from the solid.

The operation of the apparatus as a whole is as follows: The combined materials being placed in the receptacle 16, are conducted by the conveyer 20 through the fixed tube 18 and to the escape opening 19 in the sleeve 11. The vessel 1 being in rotation, movement is imparted from the pinion 23 to the pinion 25 and so to the pinion 24 on the conveyer shaft. But by reason of the differential gear 23, 24, 25, said conveyer shaft is given a speed of rotation different from that of the vessel 1. As the sleeve 11 has the same speed of rotation as the conveyer shaft 14, it follows that there is a differential rate of speed of revolution between the feed escape opening 19 and the rotary vessel; so that, as a consequence, the feed is not delivered always against the same point on the inner periphery of said vessel but is carried around and delivered at all points around the circumferential wall successively. By the action of centrifugal force, as already stated, the combined materials are projected against the inner periphery of the vessel, as shown at 36, and thereupon the liquid escapes through the openings 33 into the trough-like upper casing 29 and the inclosed portion of the lower casing 10, as indicated by the arrows at $a$, and finally leaves the machine at the opening 37. Meanwhile, the solids are carried by the conveyer 15 in a direction longitudinally the machine to the small end of the vessel, and there are ejected through openings 34 in the spider 4, as indicated by the arrows $b$.

I desire to call special attention to the fact that the combined materials to be separated are not delivered close to the end or head of the vessel 1, but are conducted into that vessel for a considerable distance by the sleeve 11. This prevents both constituents being washed quickly through the end opening 33. It is obvious that before the solid can move to the opening 33, it meets a portion of the conveyer blade, which forces it in the opposite direction, or, toward the small end of the machine. So that, while the liquid passes that conveyer blade and so goes to the outlet 33 with comparative ease, the solids are prevented from going through, or from being entrained by the liquid and washed over the edge 35.

In the form shown, the narrow ledge or ring within the larger end of the vessel 1 operates as a dam for the liquid in said vessel, and this ledge is preferably concentric with the rotating vessel.

Having now fully described my invention, what I claim as new herein and desire to secure by Letters Patent, is:—

1. In a machine for separating solids and liquids, a rotary separating vessel, an axially disposed sleeve having an escape opening in its wall disposed within said vessel, means for rotating said sleeve at a speed different from that of said vessel, and means for conveying feed through said sleeve to said escape opening therein, whereby said feed is delivered from said sleeve to all points around the circumferential wall of said vessel successively.

2. In a machine for separating solids and liquids, a horizontal rotary separating vessel, a head thereon, a sleeve having an opening in its wall within said vessel and extending into said vessel through said head, a conveyer in said vessel for moving solid material from inlet to outlet thereof, means for rotating said sleeve and said conveyer at the same speed, means for rotating said vessel at a different speed, and means for feeding materials to be separated into said sleeve and through the opening in the wall thereof to all points around the circumferential wall of said vessel successively: the said head having at a distance from its circumference an opening over the outer edge of which opening said liquid may escape by decantation.

3. In a machine for separating solids and liquids, a rotary conical separating vessel, spiders at opposite ends thereof, hollow trunnions extending from said spiders and supporting said vessel, means for conveying feed into said vessel through one of said trunnions, and means for conveying solid material from the larger end to an outlet at the smaller end of said vessel.

In testimony whereof I have signed my name to this specification in the presence of two subscribing witnesses.

THEODORE H. MILLER.

Witnesses:
 HARRY C. BARKER,
 FRANK R. LONG.